United States Patent [19]
Debbage et al.

[11] Patent Number: 5,607,650
[45] Date of Patent: Mar. 4, 1997

[54] APPARATUS FOR REMOVING CONTAMINANTS FROM GASEOUS STREAM

[75] Inventors: Lawrence Debbage, Cerritos; Eugene Kelley, Whitter; Eugene D. Guth, Torrence, all of Calif.; Larry E. Campbell, Louisville, Tenn.; Robert N. Danziger, Los Angeles, Calif.; Sally Padron, Knoxville, Tenn.

[73] Assignee: Goal Line Environmental Technologies, Los Angeles, Calif.

[21] Appl. No.: 529,519

[22] Filed: Sep. 18, 1995

Related U.S. Application Data

[63] Continuation-in-part of Ser. No. 192,003, Feb. 4, 1994, Pat. No. 5,451,558.

[51] Int. Cl.[6] .................................................. B01D 53/34
[52] U.S. Cl. .................... 422/178; 422/171; 422/177; 422/223; 422/144; 502/38; 502/53; 60/295
[58] Field of Search ................................... 422/139, 141, 422/144, 169–171, 177, 178, 180, 223, 312; 165/5, 7, 8, 10; 502/34, 38, 53; 60/295

[56] References Cited

U.S. PATENT DOCUMENTS

| | | | |
|---|---|---|---|
| 4,153,102 | 5/1979 | Stockman | 165/8 |
| 4,418,046 | 11/1983 | Izumo et al. | 422/178 |
| 4,602,673 | 7/1986 | Michelfelder et al. | 165/7 |
| 4,739,826 | 4/1988 | Michelfelder et al. | 165/133 |
| 4,903,755 | 2/1990 | Michelfelder et al. | 165/7 |
| 4,960,166 | 10/1990 | Hirt | 165/8 |
| 5,051,391 | 9/1991 | Tomisawa et al. | 502/242 |
| 5,237,939 | 8/1993 | Spokoyny et al. | 110/345 |
| 5,254,512 | 10/1993 | Ueda et al. | 422/178 |
| 5,318,102 | 6/1994 | Spokoyny et al. | 165/10 |
| 5,323,842 | 6/1994 | Spokoyny et al. | 165/7 |

Primary Examiner—Robert J. Warden
Assistant Examiner—Hien Tran
Attorney, Agent, or Firm—Kenneth H. Johnson

[57] ABSTRACT

A method of decreasing the level of NOx, CO and $SO_2$ emissions in a gas turbine is disclosed. A catalyst absorber, preferably made of alumina/platinum/carbonate salt, is used to oxidize the pollutant oxides and absorb them. The catalyst absorber can then be regenerated and reused. An apparatus for treating the stack gases and a method of making the catalyst absorber are also described.

4 Claims, 8 Drawing Sheets

APPARATUS FOR REMOVING CONTAMINANTS FROM GASEOUS STREAM

The present application is a continuation-in-part of U.S. Ser. No. 08/192,003 filed Feb. 4, 1994, now U.S. Pat. No. 5,451,558.

BACKGROUND OF THE INVENTION

1. Field of the Invention

The present invention relates to a process for reducing gaseous pollutants in the air, namely nitrogen oxides (NOx), sulfur oxides and/or carbon monoxide (CO), which are produced by combustion of hydrocarbons or hydrogen in an engine or boiler, and primarily, in a gas turbine. The present invention is also directed to an apparatus for performing the process and a process for making the reactor/catalyst absorber.

2. Art Background

Turbine power plants are becoming the standard for generating electricity because they are so efficient compared to any other form of power manufacture. Turbine power plants that burn methane to produce power for residents and manufacturing facilities in cities also produce carbon monoxide and nitrogen oxide as pollutants. It is highly desirable to reduce or eliminate these pollutants so that the air is not contaminated as a result of power production.

Initially, the permitted level of pollution by power plants for nitrogen oxides (NOx), which includes nitric oxide (NO) and nitrogen dioxide ($NO_2$), was less than 100 parts-per-million (ppm) and the level of carbon monoxide (CO) was to a level of less than 100 ppm. Later, a second step was taken to reduce the NOx to less than 25 ppm and the CO today is still permitted at any amount less than 100 ppm. Using current technology, the output levels of NOx can be reduced to the range of 5 to 9 ppm plus $NH_3$ slippage resulting from the selective catalytic reduction (SCR) technology described below.

The only technology which is currently available to obtain the 5–9 ppm NOx levels is called selective catalytic reduction, in which ammonia is mixed with flue gas and then passed over a catalyst which selectively combines the nitrogen oxides and ammonia to eliminate a major portion of the NOx. One problem with the selective catalytic reduction is that as a practical matter, it is only capable of reducing the NOx to the range of 5 to 9 ppm. Another problem referred to as slippage, is caused by hazardous ammonia passing through the catalyst.

Another problem of the SCR technology is that the operating conditions required for SCR are only achieved by expensive modifications of the down stream boiler or heat exchanger system.

There have been other technologies for reduction of pollution which have been advanced, such as overwatering in the combustor, and these also have the potential to reduce the NOx pollution, but none of them reduce the NOx to levels much less than 5 to 9 ppm.

In a copending application owned by the assignee of the present application, a system comprising essentially a two step process has been described. In the first step, the stack gases are first contacted with a catalyst under certain conditions which cause the oxidation of certain oxide pollutants, including NO and CO. In the second step, the oxidized pollutants are absorbed in an absorption bed.

It would be desirable to combine the oxidation and absorption steps into a single step performed by a single material.

SUMMARY OF THE INVENTION

The present invention has the capability of reducing hydrocarbon burning engine waste pollutants, and particularly those from a gas turbine, including nitrogen oxide, carbon monoxide and sulfur oxides. The invention, as described in more detail below, includes a novel catalytic absorber and method of making the absorber, a novel process and apparatus capable of reducing air pollutants and the method of making the apparatus.

The pollutants from a turbine in a power generating stack are primarily present as NO. The process of the present invention causes oxidation of the NO to $NO_2$. This produces $NO_2$ from substantially all of the nitrogen oxides (NO). $NO_2$ is a much more active material and can be and is absorbed readily by the catalytic absorber from the gas stream even when present at low concentrations in the ppm range.

The turbine exhaust gases are initially at about 1000° F. after the shaft energy has been withdrawn from them. These gases are then passed over heat exchangers to remove energy and produce steam while cooling the exhaust or stack gases. Stack gases are moving at high velocity depending upon the diameter of the stack, and after heat is removed, the stack gases typically are in the range of 250° to 500° F. and travel about 30–50 feet per second. The gas contains 13–15% oxygen, up to about 12% water, and about 4% carbon dioxide. This in addition to the pollutants, which are the NOx mixed with approximately 90% NO and 10% $NO_2$, CO in the range of 30 to 200 ppm and sulfur dioxide ($SO_2$) in the range of about 0.2 to 2.0 ppm when natural gas is the fuel.

The present invention involves a one step/one element process and apparatus to remove the nitrogen oxides, carbon monoxide, and sulfur oxides from the stack gases. Using a combined catalyst/absorber, the nitrogen oxides are oxidized to nitrogen dioxide; the carbon monoxides are oxidized to carbon dioxide, and the sulfur dioxide ($SO_2$) is oxidized to sulfur trioxide ($SO_3$). This oxidation occurs at temperatures in the range of 150° to about 425° F., and more preferably in the range of 175° to 400° F., and most preferably in the range of 200° to 365° F. The space velocity of the exhaust gas may be in the range of 5,000 to 50,000 per hour ($hr^{-1}$) and more preferably in the range of 10,000 to 20,000 $hr^{-1}$, although it is anticipated that a larger range will permit effective operation without an undue reduction in quality of the output gas. As used herein, the term space velocity means volume units of flow per volume units of catalyst per hour.

The catalyst absorber of the present invention absorbs the oxidized oxides so that only a small percentage, generally 10% or less of the initial oxide pollutants, pass through the system and are released. While not being bound to a particular theory, it is presently believed that the reactions which occur are as follows for each of the three pollutants, with an oxidation occurring, followed by a reaction with the carbonate such as $Na_2CO_3$:

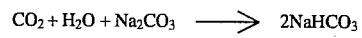

-continued

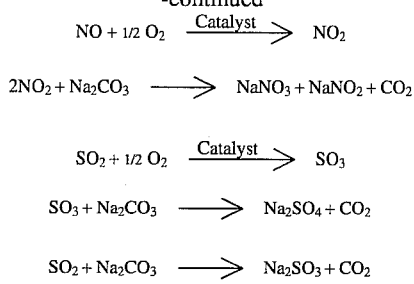

$$NO + 1/2\ O_2 \xrightarrow{Catalyst} NO_2$$

$$2NO_2 + Na_2CO_3 \longrightarrow NaNO_3 + NaNO_2 + CO_2$$

$$SO_2 + 1/2\ O_2 \xrightarrow{Catalyst} SO_3$$

$$SO_3 + Na_2CO_3 \longrightarrow Na_2SO_4 + CO_2$$

$$SO_2 + Na_2CO_3 \longrightarrow Na_2SO_3 + CO_2$$

The catalyst/absorber may be a platinum catalyst supported on alumina with an alkali or alkaline earth carbonate or bicarbonate coating thereon, the carbonate coating being lithium, sodium, potassium or calcium carbonate, and presently the preferred coating is a potassium carbonate.

The absorber, when it ceases to be effective, and specifically, when the level of pollutants emanating from the apparatus after contact with the catalyst absorber increases beyond an acceptable level, can be replaced, and the used absorber can be recharged to an effective status again. Recharging of the catalyst is accomplished by removing the spent (saturated or partially saturated) carbonate and replacing the spent carbonate with fresh unreacted carbonate.

BRIEF DESCRIPTION OF THE DRAWINGS

FIG. 1A is a drawing of a catalyst absorber sphere in a preferred embodiment.

FIG. 1B is a magnified drawing of a portion of the surface of the catalyst absorber sphere of the present invention.

FIG. 1C is a drawing of the surface of a monolith catalyst absorber of the present invention.

DETAILED DESCRIPTION OF THE INVENTION

Figure 1A:
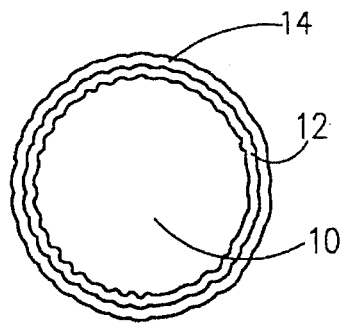
FIGS. 1A–C are schematic depiction of the catalyst absorber of the present invention.

The present invention is directed to a material for removing gaseous pollutants from combustion exhaust streams, in which the material comprises an oxidation catalyst specie disposed on a high surface area support coated with an absorber material. The oxidation catalyst specie is selected from the group of noble metal elements, base metal transitional elements and combinations thereof. More particularly, the oxidation catalyst species are selected from platinum, palladium, rhodium, cobalt, nickel, iron, copper and molybdenum, and preferably, platinum and rhodium, and most preferably, platinum.

The oxidation catalyst specie concentration is 0.05 to 0.6 percent by weight of the material, and preferably is 0.1 of 0.4 percent by weight of the material, and most preferably is 0.15 to 0.3 percent by weight of the material. More than one element may be used as an oxidation catalyst specie, and under these conditions each of said elements has a concentration in the range of 0.05 to 0.6 percent by weight.

The high surface area support is made of alumina, zirconia, titania, silica or a combination of two or more of these oxides. Preferably, the high surface area support is made of alumina. The surface area of the support is in the range of 50 to 350 square meters per gram, preferably 100 to 325 square meters per gram, and more preferably 200 to 300 square meters per gram. The high surface area support may be coated on a ceramic or metal matrix structure.

The catalyst absorber may be in a shape such as a sphere, solid cylinder, hollow cylinder, star shape or wheel shape.

The absorber is coated with at least one alkali or alkaline earth compound, which can be hydroxide compound, bicarbonate compound, or carbonate compound, or mixtures of hydroxides and/or bicarbonates and/or carbonated compounds. Preferably, the absorber comprises substantially all carbonate, and most preferably sodium carbonate, potassium carbonate or calcium carbonate. The absorber is disposed on the material at a concentration in the range of 0.5 to 20 percent by weight of the material, preferably 5.0 to 15 percent by weight of the material, and most preferably about 10% percent by weight of the material.

The process for making the novel catalyst absorber of the present invention includes applying the oxidation catalyst specie from solution. The solution is preferably a nonaqueous solution. The oxidation catalyst specie may also be applied from chloride free aqueous solution. Once applied the oxidation catalyst specie is dried after application and may be activated after application, possibly by calcining it.

After the catalyst absorber is spent or partially spent, it can be reactivated. Reactivation is accomplished by removing and replacing the spent absorber and disposing of the removed spent absorber. The spent absorber can be used as fertilizer in that it is rich in nitrogen, carbon and sulfur. Alternatively, reactivation is accomplished by decomposing components formed by the combination of pollutants with the absorber and trapping the concentrated pollution gases for disposal or use. The apparatus of the present invention supports the catalyst absorber and contacts the catalyst absorber with a combustion exhaust. It includes a means for removing spent catalyst absorber from contact with the combustion gases and at the same time moving an equivalent amount of new or regenerated catalyst absorber into contact with the combustion gas to maintain a specified outlet pollution concentration limit. The apparatus is in the shape of a wheel or carousel, or it may be a fluid bed or two or more beds which are alternately used for absorption of pollutant gases and reactivated.

Figure 1C:
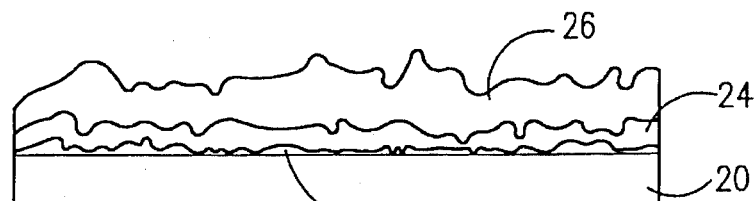
Figure 1B:
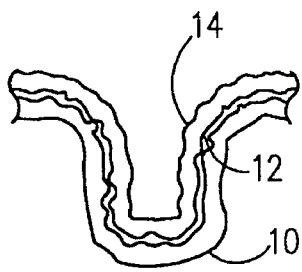

As shown in FIGS. 1A–C, the catalyst absorber of the present invention can take on different configurations. FIG. 1A shows a spherical catalyst absorber made up of an alumina sphere 10 with a platinum coating 12 and a carbonate coating 14 thereon. As shown in FIG. 1B, the surface of the sphere is very irregular so that there is an extremely large surface area per gram of material as described herein. As shown in FIG. 1C, the catalyst absorber can be in the form of a monolith surface including a ceramic or stainless steel support 20, an alumina layer 22, a platinum layer 24 and a carbonate layer 26.

Figure 2:
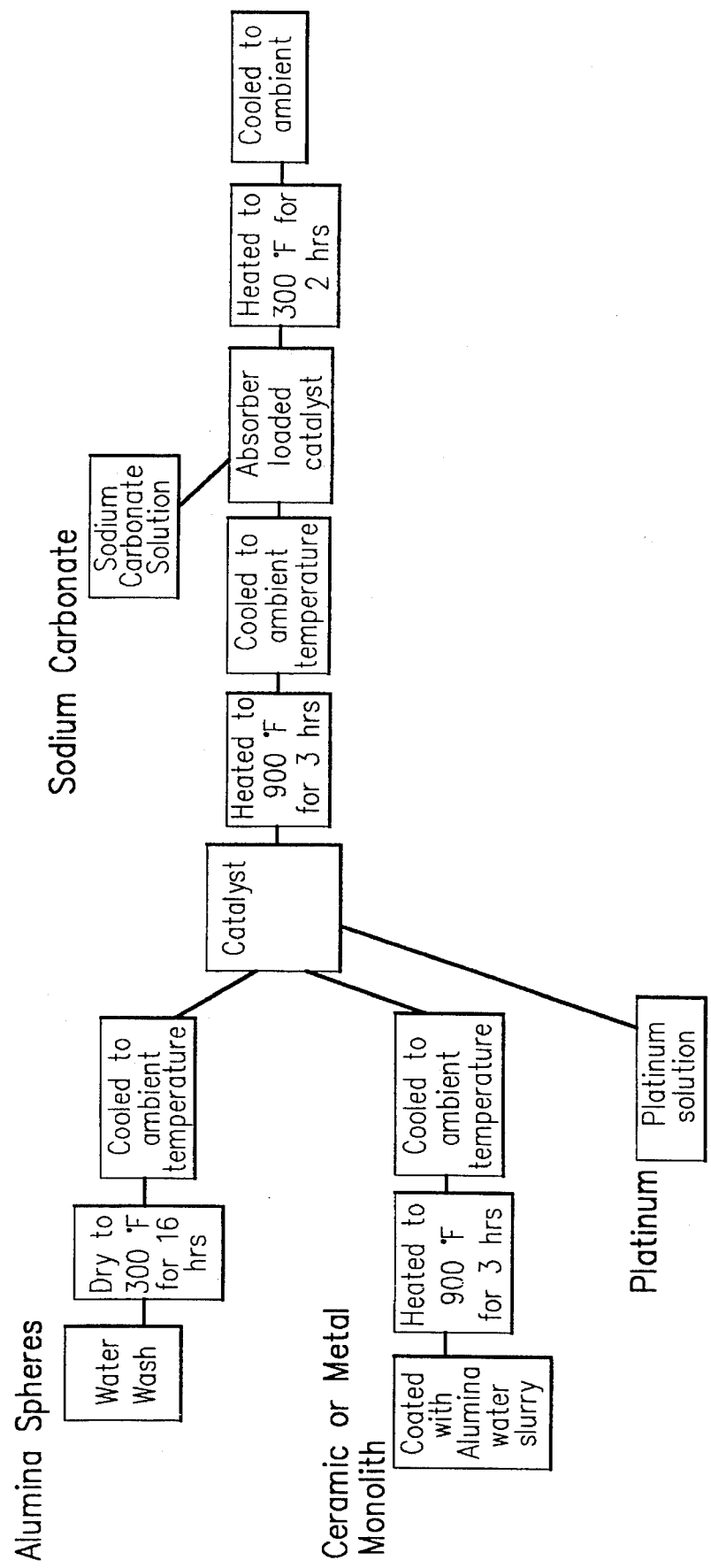
FIG. 2 is a flowchart showing the process of making the catalyst of the present invention.

The method of making the catalyst absorber is shown in FIG. 2. The catalyst/absorber of the present invention is made by starting with high surface area alumina spheres having a surface area of 50 to 350 squares per gram, these spheres being commercially available from several sources, and preferably from La Roche Chemicals, Inc., Baton Rouge, La. The spheres are approximately 1/8 inch in diameter. It will be appreciated that other forms of supports may be used without departing from the spirit and scope of the present invention. The alumina spheres are washed with distilled water to remove small particles bound loosely to the surface. The spheres are then dried for about 16 hours at 300° F. to ensure that all of the cavities and interstices in the spheres are fully dried, and that the surface is free of water. The spheres are then stored in an air-tight container until ready for further processing.

A solution of Pt 2-ethylhexanoate which contained 25% Pt was added to toluene to get a concentration of Pt such that the weight of solution equal to the toluene uptake would contain sufficient Pt to give a loading of 0.23 weight percent per weight of alumina. The platinum coated spheres were then dried for 3 hours at 900° F. in air. The spheres are then cooled to approximately room temperature and stored in an air-tight container again. The platinum coated spheres are then coated with an alkali or alkaline earth carbonate or bicarbonate coating, the alkali or alkaline earth carbonate or bicarbonate being selected from lithium, sodium, potassium or calcium carbonate or bicarbonate solution, preferably a sodium carbonate solution at a concentration of 14 percent by weight in distilled water. The water was heated to dissolve all of the sodium carbonate. The carbonate coated spheres were then dried at 300° F. for two hours. The final catalyst absorber had a coating of platinum in the amount of 0.23 weight percent added to the alumina, and 10.0 weight percent $Na_2CO_3$ added to the alumina. The spheres are then disposed in a 3×3×6 inch wire mesh basket and used as described below.

Alternatively, another form of the catalyst absorber can be made using ceramic or metal monolith supports. Tests were performed by taking a core plug of a metal monolith having approximately 300 openings per square inch, obtaining a core from the monolith of appropriate dimensions for use in the test equipment, coating the surface of the channels in the monolith with alumina from a water slurry, calcining at 900° F. for 3 hours, and cooling. This core is then coated with a platinum coating as described above with respect to the spheres and then the carbonate is applied by the method used for the spheres.

After the catalyst absorber is exhausted or saturated, it can be regenerated. A typical regeneration procedure is as follows:

1. The beads after cooling are transferred to containers approximately 7"×10"×5". The containers have closeable lids and inlet and outlet gas or drain lines.

2. Approximately 260 cubic inches of spheres are washed at 190° F. with 4 liters of demineralized water for five minutes with stirring.

3. Samples are taken as the liquid is drained off.

4. Three liters of approximately 14% sodium or potassium carbonate solution at 190° F. are added to the container.

5. The spheres are stirred and soaked for 20 minutes, or as little as 2 to 5 minutes.

6. Samples are taken as solution is drained.

7. In a 300° F. furnace the beads are dried for 45 minutes with approximately 10 scfm heated dry air flowing through the container.

8. The weighed dry beads are returned to the screen container for reuse.

Figure 3:
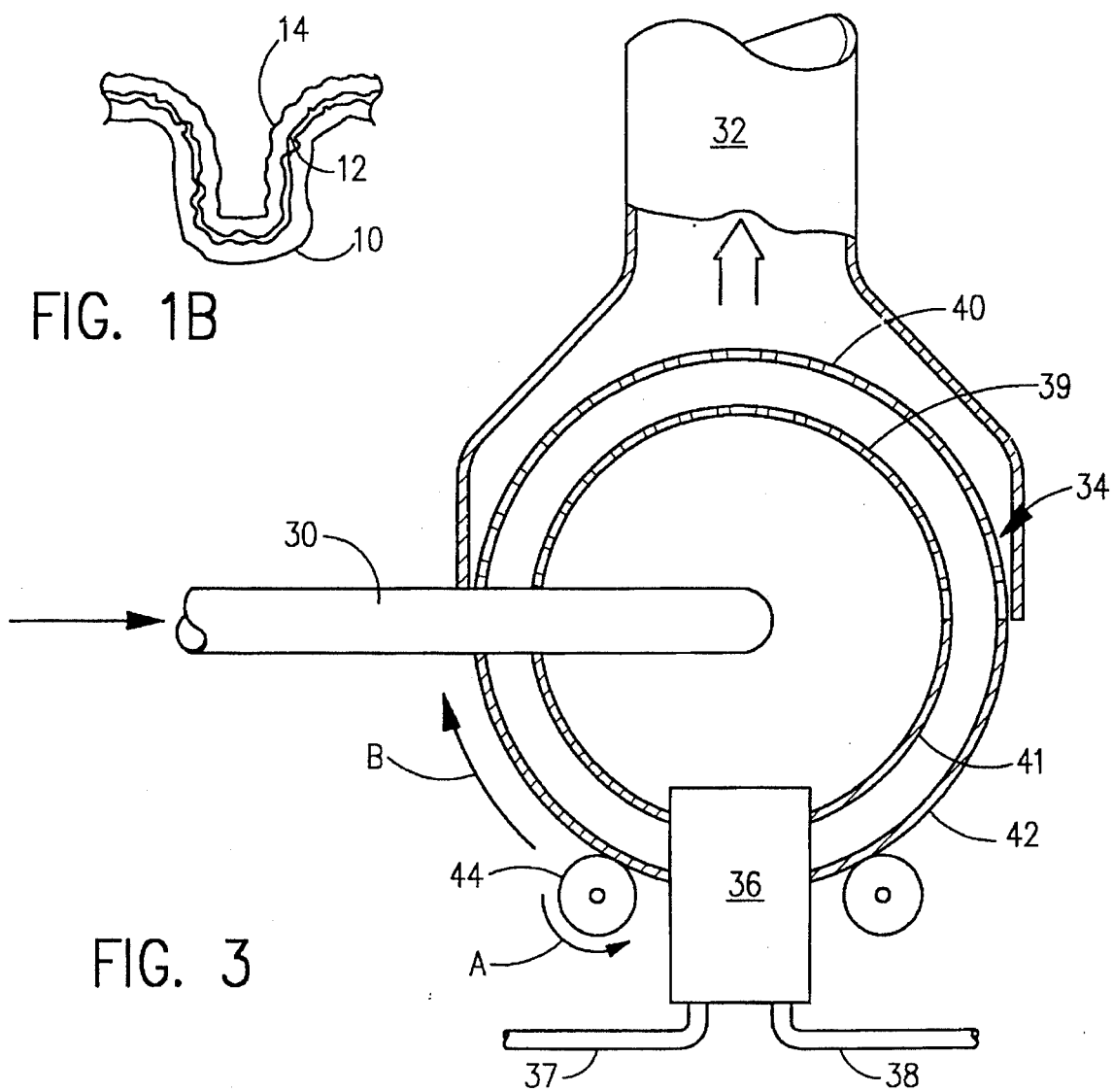
FIG. 3 is an illustration of a wheel apparatus for changing and regenerating the oxidation catalyst/absorber of the present invention.

As shown in FIG. 3, the catalyst absorber of the present invention can be installed in a wheel apparatus to permit contacting stack gases with the catalyst absorber and regenerating the catalyst absorber after it is saturated or partially saturated. As shown in FIG. 3, the wheel apparatus includes an inlet 30 for receiving the combustion gases and stack 32 for exhausting the treated gases, a cylindrical assembly 34 containing catalyst absorber and a regenerating unit 36 for regenerating the spent catalyst, the regenerating unit having an inlet 37 and outlet 38 for replenishing fresh regeneration fluid. The inner wall 39 and outer wall 40 of a portion of the wheel adjacent the stack 32 are perforated or otherwise vented to permit passage of the gas therethrough. The inner and/or outer walls 41 and 42 of the remainder of the wheel is closed so that the exhaust gases only exhaust through the stack 32. A drive 44 is used to rotate the wheel either discretely or continuously. Arrow A designates the direction of the drive 44 rotation and arrow B indicates the direction of the wheel rotation.

Figure 4:
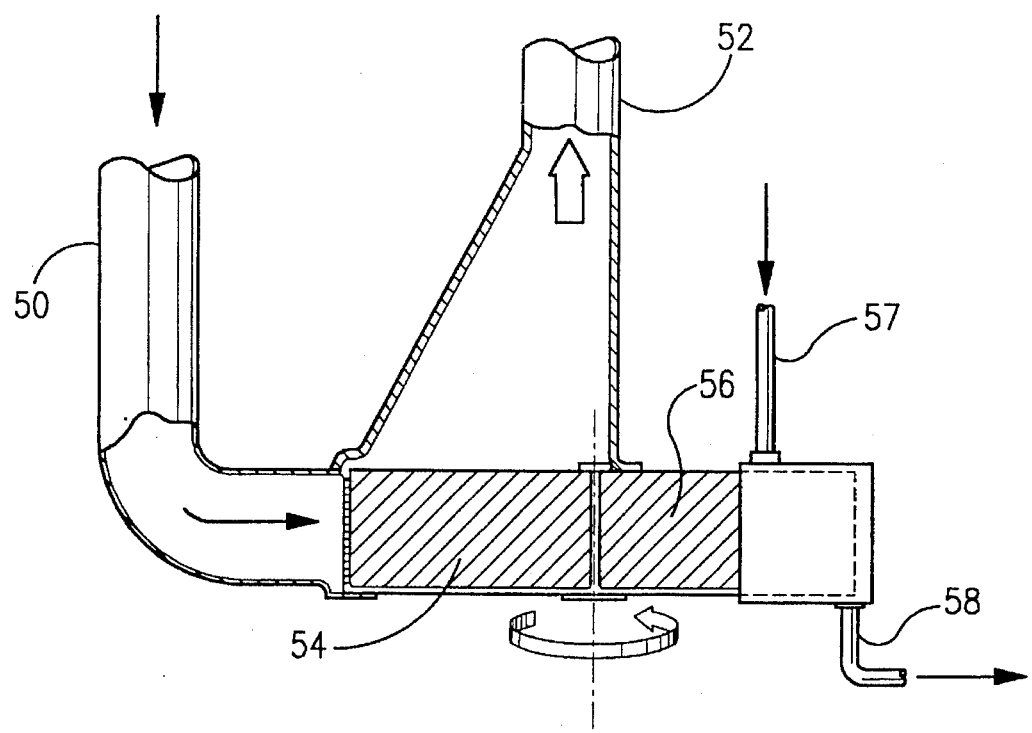
FIG. 4 is an illustration of a carousel apparatus for changing and regenerating the oxidation catalyst/absorber of the present invention.

As shown in FIG. 4, an alternative arrangement for the catalyst absorber is disclosed, in which a carousel is used. The stack gases enter through the inlet 50 and exit through the stack 52. The catalyst absorber is inserted in line with the stack gases at 54, and when spent is retracted into the carousel at 56 and a new absorber installed. The spent catalyst absorber is then regenerated. Fresh regeneration fluid enters through inlet 57 and is removed through outlet 58.

Figure 5:
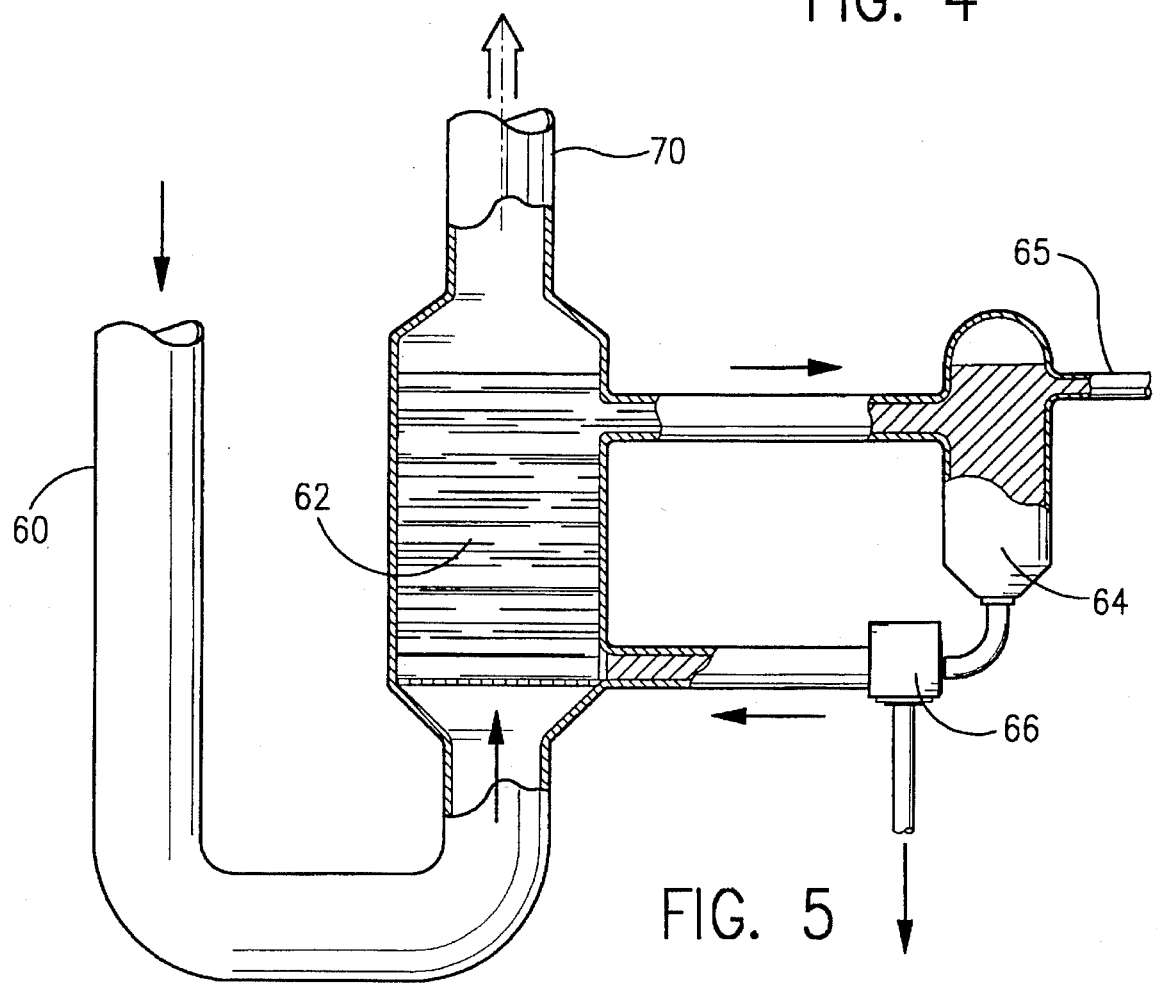
FIG. 5 is an illustration of a fluidized bed apparatus for changing and regenerating the oxidation catalyst/absorber of the present invention.

As shown in FIG. 5, a fluidized bed apparatus is disclosed. This apparatus has a combustion gas inlet 60 and stack outlet 70. There is a fluidized bed 62 in line with the gas which contains active catalyst absorber. A portion of the catalyst absorber is removed from the fluidized bed and moved to the regeneration unit 64. Regeneration fluid is sent into the regeneration unit at 65 and is removed by the fluid separator 66.

Figure 6:
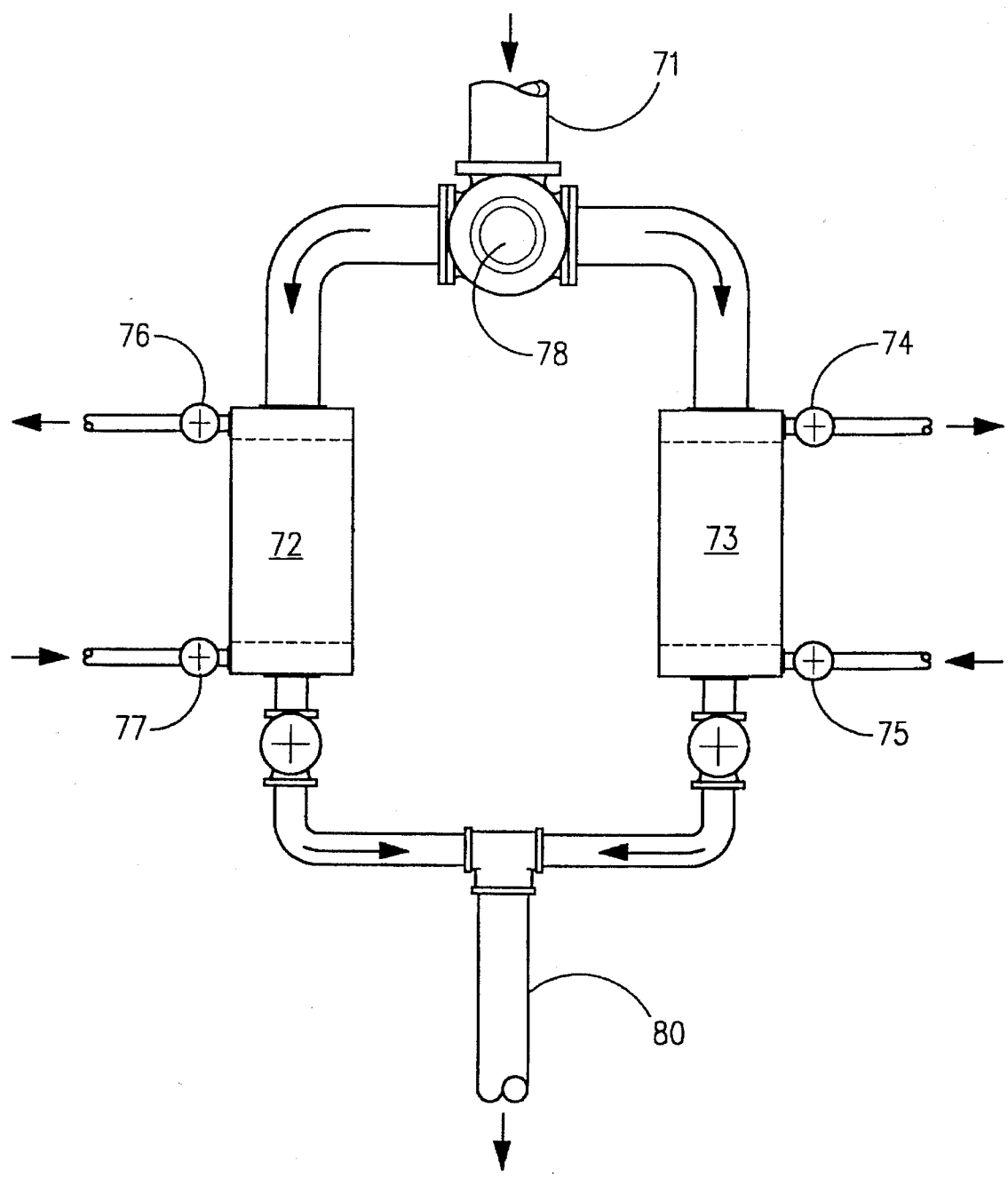
FIG. 6 is an illustration of a multiple fluidized bed apparatus for changing and regenerating the oxidation catalyst/absorber of the present invention.

As shown in FIG. 6, a multiple fluidized bed apparatus is disclosed. This apparatus has a combustion gas inlet 71 and stack outlet 80. There is a first fluidized bed 72 in line with the gas which contains active catalyst absorber. There is a second fluidized bed 73 which is being regenerated. The first fluidized bed has inlet 77 and outlet 76 with valves to permit regeneration fluid in and out. The second fluidized bed has inlet 75 and outlet 74 with valves to permit regeneration fluid in and out. Valve 78 controls whether combustion gases go to the first or second fluidized bed.

A most preferred arrangement is shown in FIGS. 7–10. The catalyst is disposed in a frame 710 having discrete beds of catalyst 730 at the end of the final heat exchanger for the turbine flue gas. The gas leaving the heat exchanger and entering the catalyst section is at a temperature of about 300° F. It has been found that the catalyst may be regenerated by subjecting the spent catalyst to a stream of reducing gas. This preferred method of regeneration is described in detail in commonly assigned co-pending patent application Ser. No. 08/371,274 filed Dec. 23, 1994, and incorporated herein by reference.

In order to achieve the regeneration the reducing gas, such as hydrogen, must be contacted with the spent catalyst. It is contemplated that only a portion of the catalyst would need to be regenerated at one time, leaving the remainder to continue to remove the contaminants. Thus the apparatus has been adapted to divert the flue gas from a particular section of the catalyst and to direct the reducing gas thereon. Additionally, means have been provided to remove the regeneration gas separately from the flue gas exiting the catalyst section.

Figure 7:
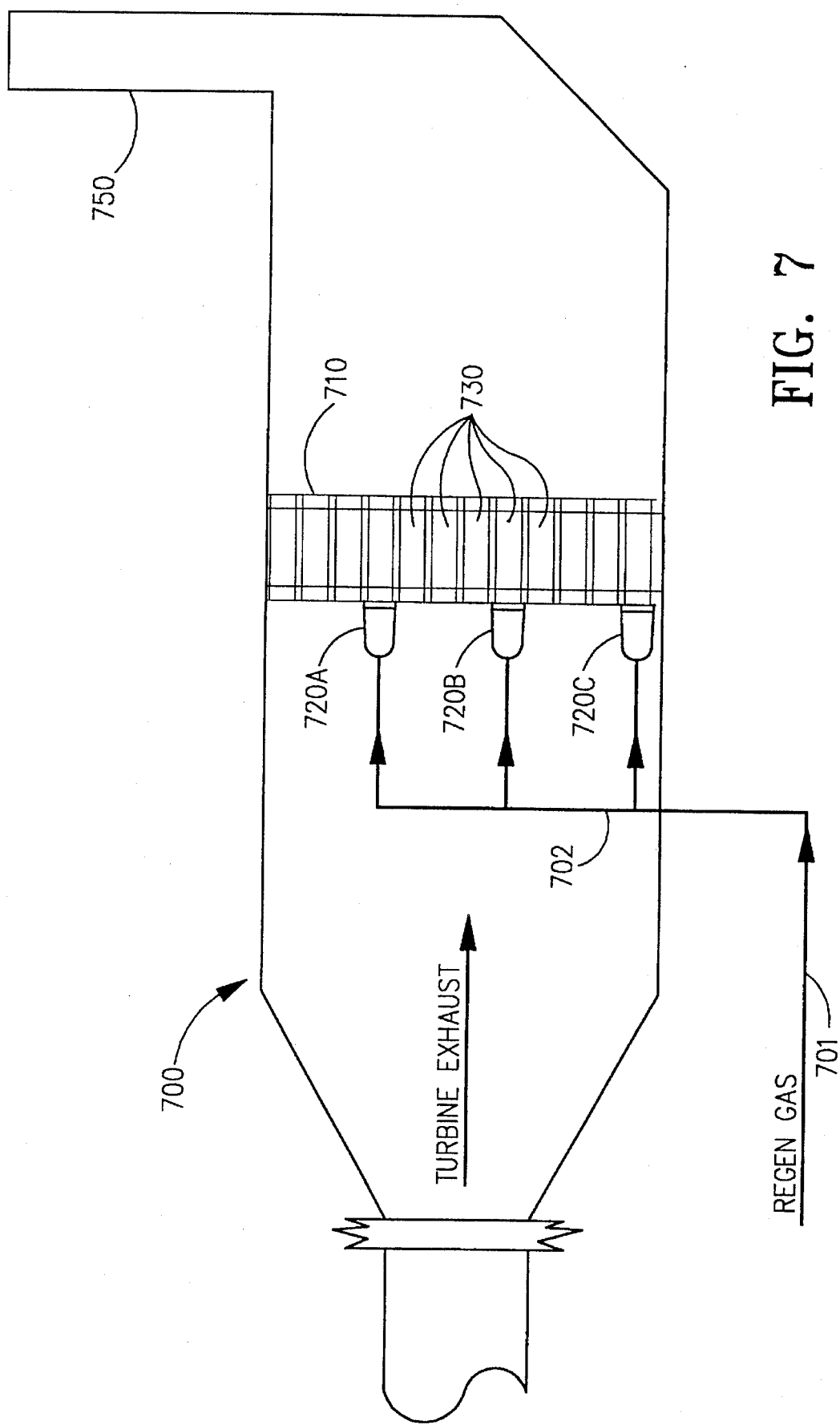
FIG. 7 is a side elevational view of one embodiment of the catalyst support in a turbine exhaust.

The apparatus for regenerating the catalyst is shown in FIGS. 7–10. FIG. 7 generally shows the catalyst 730 in frame 710 disposed in the exhaust 700 of turbine. The turbine exhaust gases pass through the frame 710 and then out the stack 750. The regeneration gas is provided by conduit 701 to header 702 which is then fed to the individual sections of the catalyst to be regenerated. The individual or discrete beds of catalyst 730 are covered by hoods 720A–720C which preclude the exhaust gases from contacting the catalyst bed being regenerated.

Figure 8:
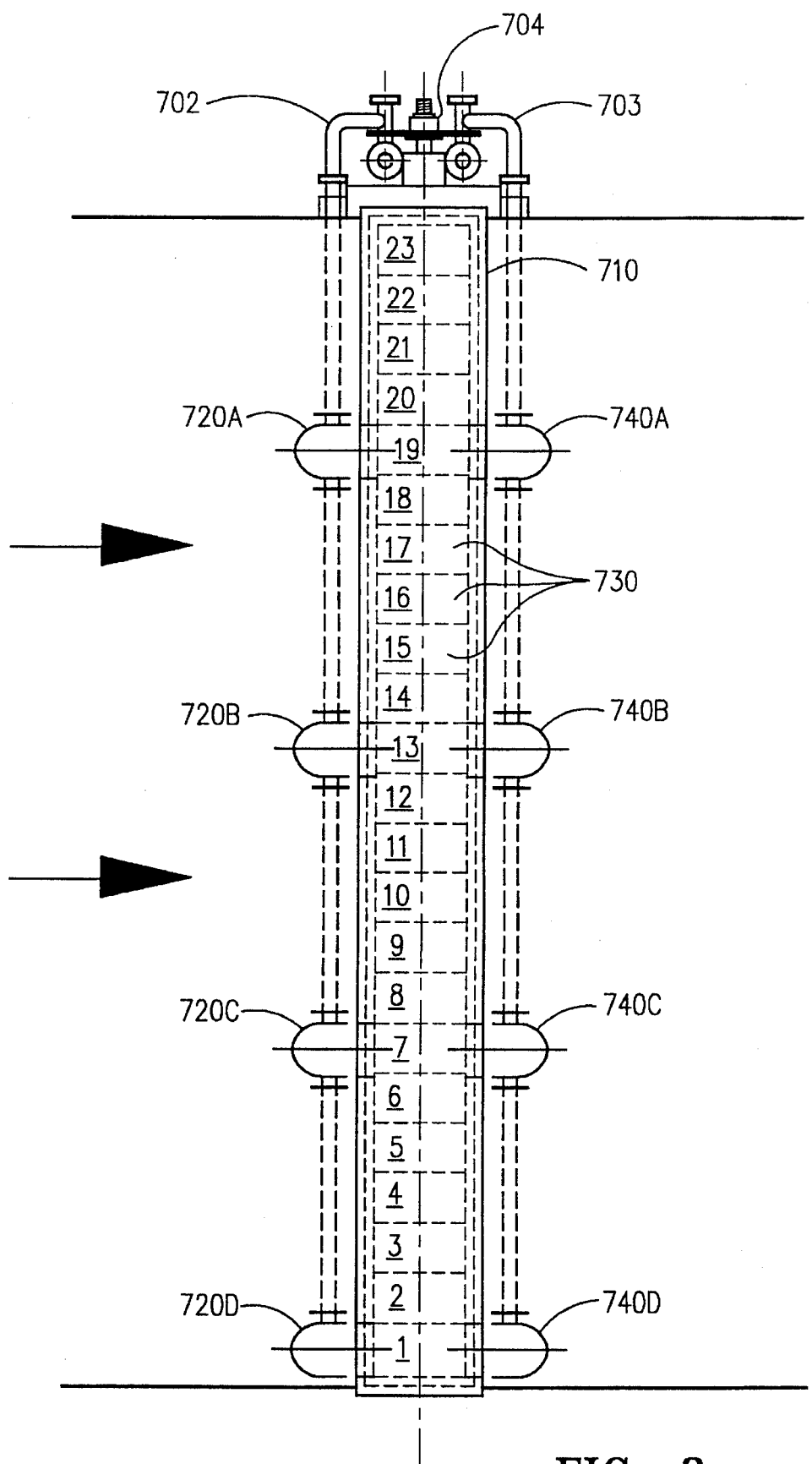
FIG. 8 is side elevational view of a frame support and catalyst regeneration mechanism.
Figure 9:
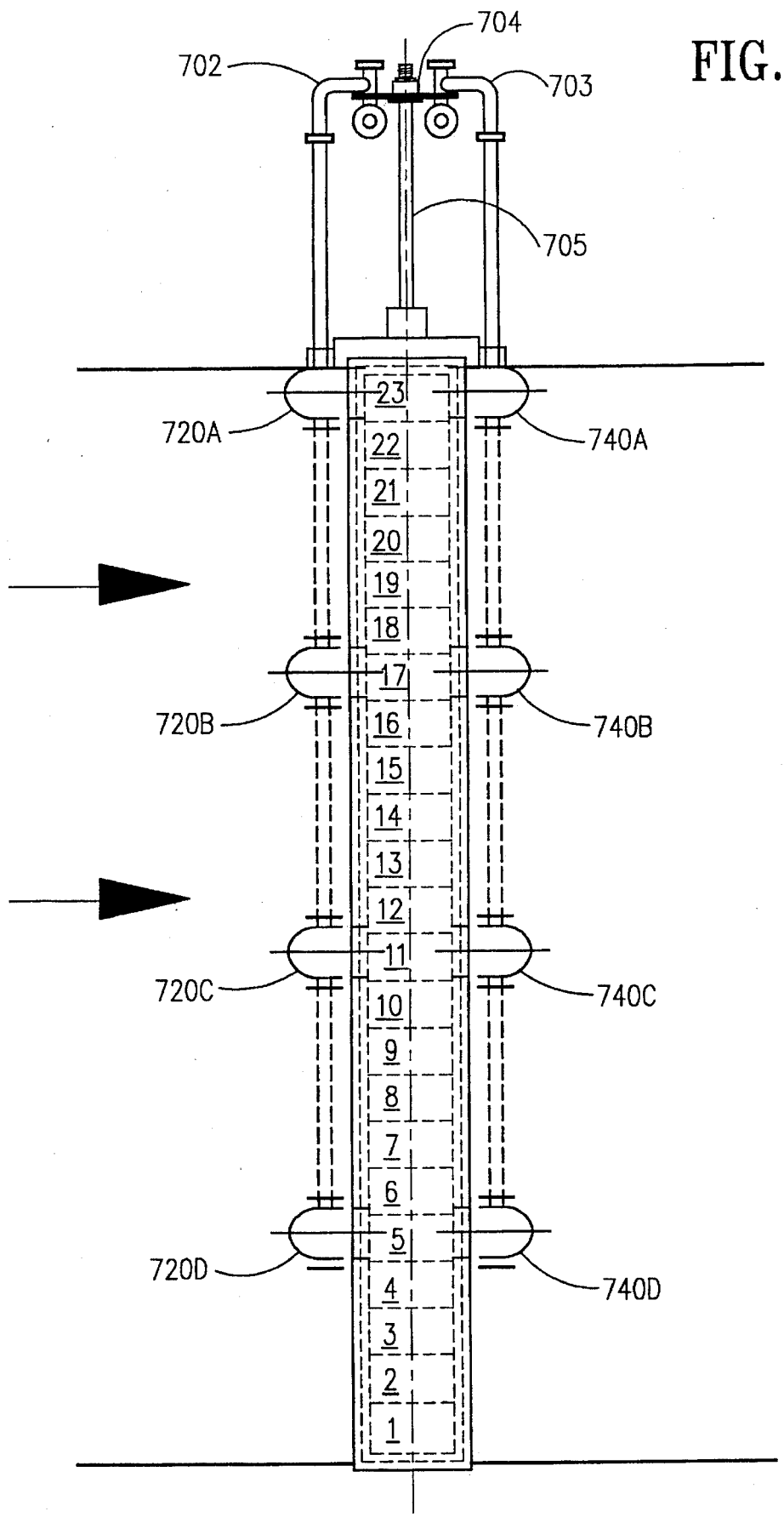
FIG. 9 is a side elevational view of the embodiment of FIG. 8 with the regeneration mechanism in the uppermost position.
Figure 10:
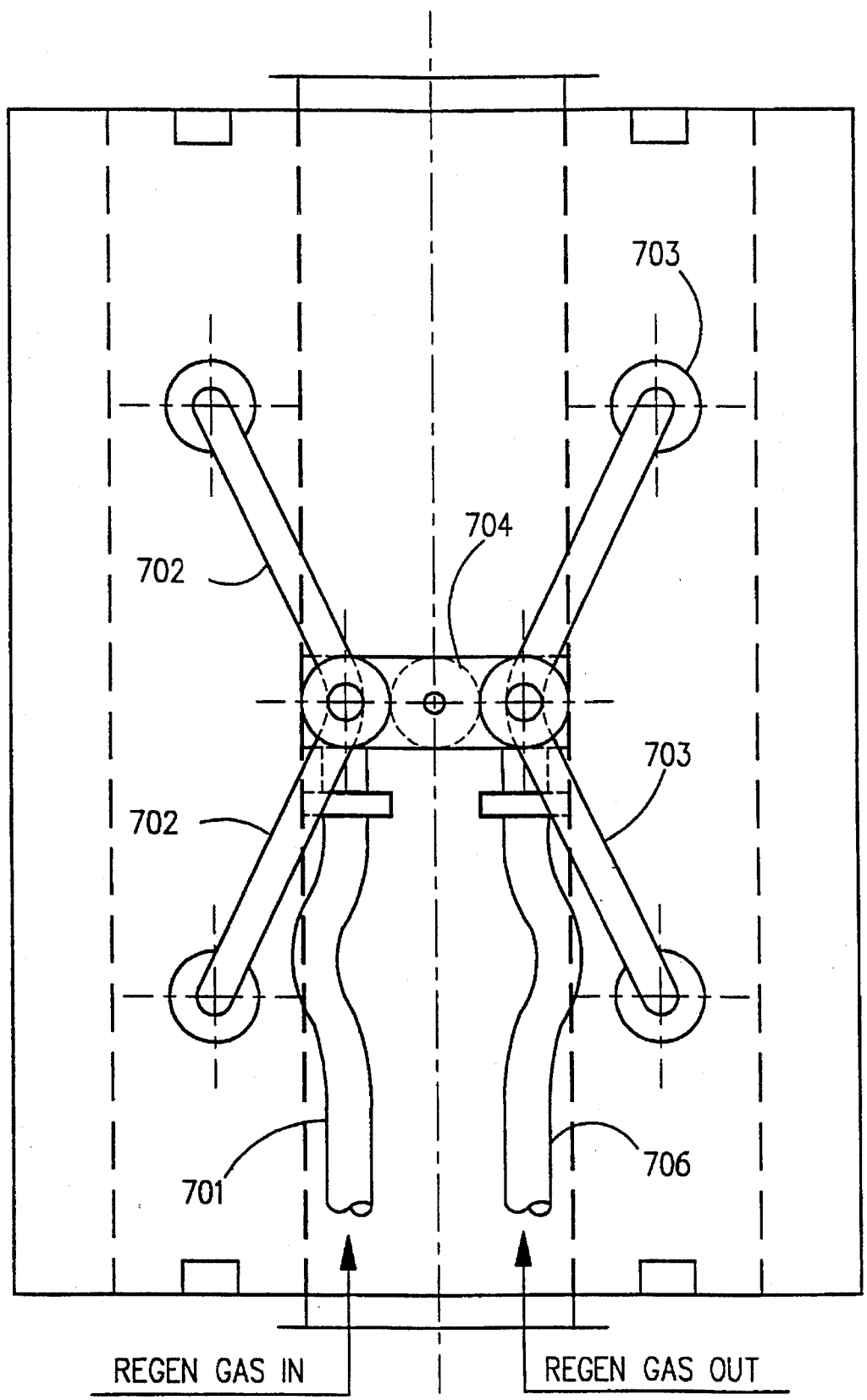
FIG. 10 is a top view of the embodiment shown in FIGS. 8 and 9.

Referring now to FIGS. 8, 9 and 10 a hood arrangement for regenerating individual sections of catalyst is shown. In this embodiment each discrete bed of catalyst 730 is one foot in height and there are 23 individual beds. There are four moveable hoods 720A–720D which are connected by regeneration gas header 702. Additionally there are four other moveable hoods 740A–740D which collect the spent regeneration gas to prevent it from exiting with the exhaust gases out the stack. The regeneration gas is collected in the header 703 and exits through the conduit 706. The moveable hoods are raised or lowered by a screw mechanism 704/705 a maximum of five feet. Four of the individual discrete beds are regenerated at once and then the hoods raised to another level, e.g. the next bed level by the screw mechanism 704/705. The hoods are shown in the uppermost position in FIG. 9. When the last bed is regenerated the hoods are lowered back down to the lowest position and the process can begin again.

In FIGS. 8 and 9 the flow of exhaust gas is indicated by the arrows. In FIG. 8 the hood sets 720A–720D/740A–740D are aligned with beds 19, 13, 7 and 1, respectively. After the appropriate regeneration cycle, the screw 704 is operated to raise screw 705 and the associated hood sets one or more bed levels. In normal operation the regeneration would move up one bed after each regeneration cycle and return to position shown in FIG. 8 after completion of the cycle shown in FIG. 9 where the hood sets are on beds 23, 17, 11 and 5. Thus the regeneration can be carried out on a continuous or intermittent schedule that will result in a repeat of the cycle as the catalyst is deactivated.

In the following examples, gas measurements were made as follows; CO was measured by a TECO model 48 infrared analyzer, $CO_2$ was measured by a Horiba $CO_2$ infrared meter and NO and $NO_2$ were measured using a TECO model #10R chemiluminescent detector with a stainless steel converter. Sulfur oxides were measured using a TECO model #43a Pulsed Fluorescence $SO_2$ Analyzer.

Examples of the performance of the present invention are set forth below.

Experiment No. 1

In each of the following experiments, the starting gas was obtained from a slip stream from the turbine exhaust from a cogeneration plant turbine. The catalyst absorber was disposed in two wire mesh baskets having a 3 inch by 3 inch by 6 inch geometry and placed in line with the slip stream in series to minimize any edge effects and ensure that all of the slip stream comes in contact with the catalyst absorber. The space velocity of the slip stream was 18,000 $hr^{-1}$. The two temperatures listed indicate the temperature for the upstream first basket and the temperature for the downstream second basket. All pollutant measurements are in ppm. NOx is the total concentration of nitrogen oxide (NO) and nitrogen dioxide ($NO_2$).

| | Initial Starting Pollutant Levels CO in. 10.98 ppm NO in. 29.0 ppm NOx in. 33.0 ppm | | | | |
|---|---|---|---|---|---|
| Time Hrs:Min | Temp 1 (°F.) | Temp 2 (°F.) | CO out (ppm) | NO out (ppm) | NOx out (ppm) |
| :15 | 230 | 216 | 0.36 | 3.0 | 3.0 |
| :30 | 355 | 323 | 0.18 | 3.0 | 4.0 |
| :45 | 355 | 328 | 0.20 | 3.0 | 4.0 |
| 1 hr. | 354 | 329 | 0.19 | 3.0 | 5.0 |
| 1:15 | 352 | 328 | 0.20 | 3.0 | 5.0 |
| 1:30 | 351 | 328 | 0.23 | 2.5 | 6.0 |
| 1:45 | 350 | 327 | 0.25 | 3.0 | 7.0 |
| 2 hrs. | 348 | 325 | 0.17 | 7.0 | 8.0 |
| 2:15 | 348 | 325 | 0.17 | 7.0 | 8.0 |
| 2:30 | 348 | 325 | 0.19 | 8.0 | 10.0 |
| 2:45 | 348 | 325 | 0.18 | 9.0 | 10.0 |
| 3 hrs. | 348 | 325 | 0.18 | 10.0 | 11.0 |
| 3:15 | 347 | 325 | 0.17 | 11.0 | 12.0 |
| 3:30 | 346 | 323 | 0.17 | 11.0 | 12.0 |
| 3:45 | 346 | 322 | 0.18 | 12.0 | 13.0 |

Experiment No. 1-a

The catalyst absorber was regenerated and the experiment was run again under the same conditions using the regenerated catalyst absorber.

| | Initial Starting Pollutant Levels CO in. 9.91 ppm NO in. 30.0 ppm NOx in. 36.0 ppm | | | | |
|---|---|---|---|---|---|
| Time Hrs:Min | Temp 1 (°F.) | Temp 2 (°F.) | CO out (ppm) | NO out (ppm) | NOx out (ppm) |
| :15 | 135 | 162 | 2.49 | 16.0 | 16.0 |
| :30 | 365 | 160 | .13 | 5.0 | 5.0 |
| :45 | 363 | 351 | .05 | 2.0 | 2.0 |
| 1 hr. | 363 | 353 | .05 | 2.5 | 2.5 |
| 1:15 | 362 | 353 | .08 | 4.0 | 4.0 |
| 1:30 | 362 | 352 | .05 | 4.5 | 5.0 |
| 1:45 | 362 | 354 | .07 | 5.5 | 6.0 |
| 2 hrs. | 362 | 354 | .07 | 6.0 | 7.0 |
| 2:15 | 362 | 354 | .07 | 7.0 | 8.0 |
| 2:30 | 361 | 353 | .06 | 7.5 | 8.5 |
| 2:45 | 362 | 354 | .09 | 8.5 | 9.5 |
| 3 hrs. | 362 | 354 | .08 | 9.0 | 10.0 |
| 3:15 | 362 | 354 | .08 | 9.0 | 10.5 |
| 3:30 | 363 | 355 | .08 | 10.0 | 11.5 |
| 3:45 | 363 | 356 | .08 | 10.0 | 12.0 |
| 4 hrs. | 364 | 356 | .07 | 10.5 | 12.5 |

It is believed that the first reading at 15 minutes showed high pollution level because the temperature of the catalyst absorber was below the necessary temperature for oxidation.

Experiment No. 1-b

The catalyst absorber was regenerated a second time and the experiment was run again under the same conditions using the twice regenerated catalyst absorber.

| | Initial Starting Pollutant Levels |
|---|---|
| | CO in. 13.16 ppm |
| | NO in, 26.0 ppm |
| | NOx in, 32.5 ppm |

| Time Hrs:Min | Temp 1 (°F.) | Temp 2 (°F.) | CO out (ppm) | NO out (ppm) | NOx out (ppm) |
|---|---|---|---|---|---|
| :15 | 133 | 134 | 0.2 | 23.0 | 23.0 |
| :30 | 296 | 139 | 3.02 | 16.0 | 16.0 |
| :45 | 313 | 142 | 0.43 | 7.5 | 7.5 |
| 1 hr. | 296 | 296 | 0.30 | 6.0 | 6.0 |
| 1:15 | 285 | 285 | 0.34 | 7.0 | 7.0 |
| 1:30 | 279 | 278 | 0.37 | 8.5 | 8.5 |
| 1:45 | 282 | 273 | 0.40 | 10.0 | 10.0 |
| 2 hrs. | 304 | 290 | 0.30 | 9.5 | 9.5 |
| 2:15 | 320 | 308 | 0.25 | 9.5 | 10.0 |
| 2:30 | 330 | 319 | 0.22 | 10.0 | 11.0 |
| 2:45 | 339 | 329 | 0.20 | 10.5 | 12.0 |
| 3 hrs. | 343 | 334 | 0.20 | 11.5 | 12.5 |
| 3:15 | 347 | 338 | 0.22 | 12.0 | 14.0 |

Experiment No. 1-c

The catalyst absorber was regenerated again and the experiment was run again under the same conditions using the three time regenerated catalyst absorber.

| | Initial Starting Pollutant Levels |
|---|---|
| | CO in. 12.13 ppm |
| | NO in, 28.0 ppm |
| | NOx in, 34.0 ppm |

| Time Hrs:Min | Temp 1 (°F.) | Temp 2 (°F.) | CO out (ppm) | NO out (ppm) | NOx out (ppm) |
|---|---|---|---|---|---|
| :15 | 142 | 155 | 7.61 | 20.0 | 20.0 |
| :30 | 352 | 195 | 0.30 | 3.0 | 3.0 |
| :45 | 350 | 342 | 0.22 | 2.5 | 2.5 |
| 1 hr. | 351 | 342 | 0.23 | 3.0 | 3.5 |
| 1:15 | 351 | 343 | 0.24 | 4.0 | 4.5 |
| 1:30 | 351 | 345 | 0.24 | 5.0 | 5.5 |
| 1:45 | 351 | 344 | 0.27 | 6.0 | 6.5 |
| 2 hrs. | 352 | 345 | 0.24 | 6.5 | .7.5 |
| 2:15 | 351 | 346 | 0.24 | 8.0 | 9.0 |
| 2:30 | 351 | 345 | 0.23 | 8.0 | 9.0 |
| 2:45 | 351 | 345 | 0.30 | 9.0 | 10.0 |
| 3 hrs. | 350 | 343 | 0.37 | 9.5 | 11.0 |
| 3:15 | 350 | 342 | 0.28 | 10.0 | 12.0 |
| 3:30 | 348 | 341 | 0.30 | 11.0 | 12.0 |
| 3:45 | 348 | 341 | 0.30 | 12.0 | 13.5 |

Experiment No. 1-d

The catalyst absorber was regenerated again and the experiment was run again under the same conditions using the four time regenerated catalyst absorber.

| | Initial Starting Pollutant Levels |
|---|---|
| | CO in. 13.16 ppm |
| | NO in, 28.0 ppm |
| | NOx in, 34.0 ppm |

| Time Hrs:Min | Temp 1 (°F.) | Temp 2 (°F.) | CO out (ppm) | NO out (ppm) | NOx out (ppm) |
|---|---|---|---|---|---|
| :15 | 132 | 132 | 10.28 | 22.0 | 23.0 |
| :30 | 353 | 143 | 1.22 | 8.0 | 8.0 |
| :45 | 351 | 259 | 0.45 | 4.0 | 4.5 |
| 1 hr. | 350 | 338 | 0.42 | 4.0 | 4.5 |
| 1:15 | 349 | 338 | 0.43 | 5.0 | 5.5 |
| 1:30 | 349 | 338 | 0.41 | 6.0 | 6.5 |
| 1:45 | 349 | 339 | 0.41 | 7.0 | 7.5 |
| 2 hrs. | 349 | 339 | 0.42 | 8.0 | 9.0 |
| 2:15 | 348 | 338 | 0.46 | 8.5 | 9.5 |
| 2:30 | 349 | 339 | 0.45 | 9.5 | 10.5 |
| 2:45 | 349 | 339 | 0.49 | 10.0 | 11.5 |
| 3 hrs. | 349 | 339 | 0.48 | 10.5 | 12.0 |
| 3:15 | 350 | 340 | 0.55 | 11.0 | 13.0 |

Experiment No. 2

The conditions for this series of experiments was the same as those for Experiment No. 1. This series was begun with a new catalyst absorber of the same type and configuration as described above for Experiment No. 1.

| | Initial Starting Pollutant Levels |
|---|---|
| | CO in. 10.98 ppm |
| | NO in, 29.0 ppm |
| | NOx in, 33.0 ppm |

| Time Hrs:Min | Temp 1 (°F.) | Temp 2 (°F.) | CO out (ppm) | NO out (ppm) | NOx out (ppm) |
|---|---|---|---|---|---|
| :15 | 345 | 225 | 0.20 | 2.0 | 2.0 |
| :30 | 348 | 308 | 0.19 | 2.0 | 2.5 |
| :45 | 350 | 315 | 0.22 | 2.0 | 2.0 |
| 1 hr. | 350 | 317 | 0.24 | 2.0 | 2.5 |
| 1:15 | 351 | 317 | 0.23 | 2.5 | 2.5 |
| 1:30 | 351 | 318 | 0.23 | 3.0 | 3.0 |
| 1:45 | 351 | 317 | 0.24 | 3.5 | 4.0 |
| 2 hrs. | 351 | 317 | 0.26 | 5.0 | 7.0 |
| 2:15 | 350 | 318 | 0.24 | 6.0 | 8.0 |
| 2:30 | 351 | 319 | 0.25 | 8.0 | 10.0 |
| 2:45 | 351 | 320 | 0.23 | 10.0 | 11.0 |
| 3 hrs. | 352 | 320 | 0.26 | 10.0 | 12.0 |
| 3:15 | 352 | 320 | 0.22 | 11.0 | 12.0 |
| 3:30 | 353 | 321 | 0.26 | 11.0 | 13.0 |

Experiment No. 2-a

The catalyst absorber was regenerated and the experiment was run again under the same conditions using the regenerated catalyst absorber.

| | Initial Starting Pollutant Levels |
|---|---|
| | CO in. 11 ppm |
| | NO in, 29 ppm |
| | NOx in, 33 ppm |

| Time Hrs:Min | Temp 1 (°F.) | Temp 2 (°F.) | CO out (ppm) | NO out (ppm) | NOx out (ppm) |
|---|---|---|---|---|---|
| :15 | 144 | 142 | 7.75 | 20.0 | 20.0 |
| :30 | 374 | 142 | 0.39 | 5.0 | 5.0 |
| :45 | 372 | 358 | 0.17 | 2.0 | 2.0 |
| 1 hr. | 371 | 362 | 0.15 | 1.5 | 2.0 |
| 1:15 | 370 | 363 | 0.17 | 3.0 | 3.5 |
| 1:30 | 370 | 363 | 0.17 | 4.0 | 4.5 |
| 1:45 | 368 | 361 | 0.18 | 4.5 | 5.0 |
| 2 hrs. | 367 | 369 | 0.13 | 5.0 | 6.0 |
| 2:15 | 367 | 360 | 0.15 | 6.5 | 7.5 |
| 2:30 | 366 | 358 | 0.17 | 7.5 | 8.5 |
| 2:45 | 366 | 359 | 0.18 | 8.0 | 9.0 |
| 3 hrs. | 366 | 358 | 0.14 | 9.0 | 10.0 |
| 3:15 | 366 | 358 | 0.17 | 10.0 | 11.0 |
| 3:30 | 365 | 358 | 0.17 | 10.0 | 11.5 |

-continued

| | Initial Starting Pollutant Levels CO in. 11 ppm NO in, 29 ppm NOx in, 33 ppm | | | | |
|---|---|---|---|---|---|
| Time Hrs:Min | Temp 1 (°F.) | Temp 2 (°F.) | CO out (ppm) | NO out (ppm) | NOx out (ppm) |
| 3:45 | 363 | 356 | 0.18 | 10.5 | 12.0 |
| 4 hrs. | 362 | 354 | 0.17 | 11.5 | 13.0 |

Experiment No. 2-b

The catalyst again absorber was regenerated and the experiment was run again under the same conditions using the twice regenerated catalyst absorber.

| | Initial Starting Pollutant Levels CO in. 11 ppm NO in, 29 ppm NOx in, 33 ppm | | | | |
|---|---|---|---|---|---|
| Time Hrs:Min | Temp 1 (°F.) | Temp 2 (°F.) | CO out (ppm) | NO out (ppm) | NOx out (ppm) |
| :15 | 186 | 142 | 5.53 | 18.0 | 18.0 |
| :30 | 279 | 144 | 2.65 | 12.0 | 13.0 |
| :45 | 275 | 255 | 0.85 | 7.0 | 7.0 |
| 1 hr. | 271 | 254 | 0.65 | 7.0 | 7.0 |
| 1:15 | 267 | 253 | 0.77 | 9.0 | 9.0 |
| 1:30 | 274 | 255 | 0.78 | 10.0 | 10.0 |
| 1:45 | 283 | 262 | 0.73 | 11.0 | 11.0 |
| 2 hrs. | 284 | 266 | 0.68 | 11.0 | 11.5 |
| 2:15 | 282 | 266 | 0.68 | 13.0 | 13.0 |

Experiment No. 2-c

The catalyst absorber was regenerated again and the experiment was run again under the same conditions using the three time regenerated catalyst absorber.

| | Initial Starting Pollutant Levels CO in. 9.05 ppm NO in, 26.0 ppm NOx in, 32.0 ppm | | | | |
|---|---|---|---|---|---|
| Time Hrs:Min | Temp 1 (°F.) | Temp 2 (°F.) | CO out (ppm) | NO out (ppm) | NOx out (ppm) |
| :15 | 354 | 142 | 1.06 | 7.0 | 7.0 |
| :30 | 356 | 150 | 0.49 | 2.0 | 2.0 |
| :45 | 354 | 338 | 0.41 | 2.0 | 2.0 |
| 1 hr. | 351 | 337 | 0.43 | 2.0 | 3.0 |
| 1:15 | 352 | 338 | 0.45 | 3.0 | 5.0 |
| 1:30 | 352 | 339 | 0.50 | 6.0 | 7.0 |
| 1:45 | 352 | 337 | 0.50 | 7.0 | 8.0 |
| 2 hrs. | 351 | 338 | 0.50 | 8.0 | 9.0 |
| 2:15 | 350 | 336 | 0.49 | 8.5 | 9.5 |
| 2:30 | 349 | 335 | 0.50 | 9.0 | 10.0 |
| 2:45 | 348 | 334 | 0.56 | 10.0 | 11.0 |
| 3 hrs. | 348 | 334 | 0.58 | 11.0 | 12.0 |

Experiment 3—First Run

This experiment was run using a monolith core catalyst in a laboratory set up under the conditions set forth below. The space velocity was 10,000 hr$^{-1}$s. The initial starting pollutant levels are set out at time zero (0) minutes. Only one catalyst absorber unit was used and the temperature was measured just before the catalyst absorber.

| Time Minutes | Temp (°F.) | CO (ppm) | NOx (ppm) | NO (ppm) | Sulfur (SO$_2$) (ppm) |
|---|---|---|---|---|---|
| Input Concentrations | 351 | 18.0 | 33.0 | 29.0 | 0.5 |
| 1 | 405 | 0 | 1.0 | | 0.5 |
| 2 | 415 | | 1.0 | 0.5 | 0.35 |
| 5 | 420 | | 0.75 | | 0.059 |
| 10 | 480 | | 0.45 | | 0.004 |
| 20 | 401 | 0 | 0.4 | | 0 |
| 32 | 380 | | 2.4 | | 0.004 |
| 42 | 408 | | 2.3 | | 0.007 |
| 48 | 360 | | 1.5 | | 0.001 |
| 50 | 344 | | 1.85 | | 0.002 |
| 64 | 296 | | 5.2 | 4.2 | 0.016 |
| 75 | 291 | | 8.6 | 7.1 | 0.023 |
| 85 | 291 | | 9.0 | | 0.037 |

Experiment 3—Second Run

The catalyst absorber was regenerated and the experiment was run again under the same conditions using the regenerated catalyst absorber.

| Time Minutes | Temp (°F.) | CO (ppm) | NOx (ppm) | NO (ppm) | Sulfur (SO$_2$) (ppm) |
|---|---|---|---|---|---|
| Input Concentrations | | 20.0 | 34.0 | 31.0 | 0.51 |
| 0.5 | 378 | 0.1 | 1.8 | | 0.08 |
| 1 | 369 | 0.1 | 1.8 | | 0.02 |
| 2 | 343 | 0.1 | 1.75 | 1.55 | 0.32 |
| 3 | 326 | 0.1 | 1.75 | 1.6 | 0.19 |
| 6 | 300 | 0.1 | 2.0 | 1.85 | 0.05 |
| 10 | 286 | 0.1 | 2.6 | 2.6 | 0.025 |
| 12 | 284 | 0.1 | 3.0 | | 0.021 |
| 21 | 287 | 0.1 | 5.0 | | 0.021 |
| 25 | 288 | 0.1 | 6.2 | 6.2 | 0.024 |
| 30 | 291 | 0.1 | 9.0 | 7.9 | 0.02 |
| 47 | 300 | 0.1 | 13.5 | 12.5 | 0.05 |

Experiment No. 4

In the following experiment, the starting gas was obtained from a slip stream from the turbine exhaust from a cogeneration plant turbine, as with Experiments 1 and 2. The catalyst has the same configuration as in Experiments 1 and 2. The space velocity of the slip stream was 18,000 hr$^{-1}$. The temperature for the upstream first basket was 330° F. and 300° F. for the downstream second basket. All pollutant measurements are in ppm.

| Time Minutes | O (ppm) | NOx (ppm) | NO (ppm) | NO$_2$ (ppm) |
|---|---|---|---|---|
| Input Concentrations | 20.0 | 33 | 27 | 6 |
| 0 | 0 | 1.5 | 1.5 | 0 |
| .5 | 0 | 1.5 | 1.5 | 0 |
| 1.5 | 0 | 5 | 5 | 10 |
| 3 | 0 | 10 | 10 | 0 |

To apply the catalyst absorber to the continuous reduction of gaseous pollutants in stack gases, an apparatus is required. The catalyst absorber is moved into contact with the stack gas and remains there until the outlet levels of carbon monoxide, nitrogen oxides and/or sulfur oxides exceed some specified low concentrations. The catalyst absorber is then moved out of contact with the stack gases for regeneration while being replaced with fresh or previously regenerated catalyst absorber. The regenerated catalyst absorber is cycled back into contact with the stack gases in sequence.

The apparatus to apply the catalyst absorber of the present invention can be in the form of a wheel or carousel, a portion of which is in contact with the stack gas and a portion of which is outside of contact with the stack gas. In this case, the catalyst absorber is mounted to the wheel and moves in and out of the stack gas stream as the wheel rotates. The apparatus may alternatively be a moving continuous belt with the catalyst absorber being disposed on the belt. Alternatively, a fluidized bed of the alumina spheres of the catalyst absorbed can be located in the stack gas stream. In this embodiment a small fraction of the catalyst absorber, for example, one percent per minute, is continuously removed, regenerated and returned. Any other apparatus could be used to accomplish the goals specified herein, the choice of such apparatus depending upon the individual applications.

It would be obvious to a person of ordinary skill in the art that a number of changes and modifications can be made to the presently described process, apparatus and methods without departing from the spirit and scope of the present invention. It is contemplated that the present invention is encompassed by the claims as presented herein and by all variations thereof coming within the scope of equivalents accorded thereto.

The invention claimed is:

1. An apparatus for contacting a catalyst absorber with combustion exhaust gases comprising means for removing spent catalyst absorber from contact with exhaust gases at the same time moving an equivalent amount of new or regenerated catalyst absorber into contact with the exhaust gases to maintain a specified outlet pollution concentration limit, at least two beds of catalyst absorber which alternately are used for absorption of pollutants from the exhaust gases, said beds being disposed horizontally along a vertical axis, said means comprising at least one first hood being positioned movably along said axis adjacent to and upstream of a first of said beds to prevent the exhaust gases from contacting said first bed, said first hood being connected to a source of regenerating gas for introducing the regeneration gas to said first bed, and at least one second hood cooperatively aligned with said first hood, adjacent to and downstream of said first bed for recovering spent regenerating gas while preventing said regeneration gas from exiting with said exhaust gases.

2. The apparatus of claim 1 wherein said at least two beds comprise a plurality of beds; said first and second hoods comprise a plurality of first and second hoods cooperatively aligned and spaced apart to align with a set of beds, said set of beds being fewer than the plurality of said beds.

3. The apparatus of claim 1 comprising a frame supporting said at least two beds of said catalyst absorber.

4. The apparatus of claim 3 wherein said hoods are moveable upward and downward by a screw drive.

* * * * *